(12) United States Patent
Otaki et al.

(10) Patent No.: US 11,600,846 B2
(45) Date of Patent: *Mar. 7, 2023

(54) ALL-SOLID-STATE LITHIUM ION SECONDARY BATTERY

(71) Applicant: TOYOTA JIDOSHA KABUSHIKI KAISHA, Toyota (JP)

(72) Inventors: Mitsutoshi Otaki, Susono (JP);
Norihiro Ose, Sunto-gun (JP);
Shigenori Hama, Sunto-gun (JP);
Kazuyuki Taniguchi, Annaka (JP);
Yoshiyasu Yamada, Tomioka (JP);
Tetsuo Nakanishi, Annaka (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 212 days.

This patent is subject to a terminal disclaimer.

(21) Appl. No.: 16/007,621

(22) Filed: Jun. 13, 2018

(65) Prior Publication Data

US 2019/0013541 A1  Jan. 10, 2019

(30) Foreign Application Priority Data

Jul. 6, 2017 (JP) .............................. JP2017-133109

(51) Int. Cl.
*H01M 10/0525* (2010.01)
*H01M 10/0562* (2010.01)
(Continued)

(52) U.S. Cl.
CPC ....... *H01M 10/0525* (2013.01); *H01M 4/386* (2013.01); *H01M 4/405* (2013.01);
(Continued)

(58) Field of Classification Search
CPC combination set(s) only.
See application file for complete search history.

(56) References Cited

U.S. PATENT DOCUMENTS 8,124,279 B2 * 2/2012 Petrat .................... H01M 4/364
429/218.1
2006/0166098 A1  7/2006 Tabuchi et al.
(Continued)

FOREIGN PATENT DOCUMENTS

CN   102263242 A   11/2011
CN   103189313 A   7/2013
(Continued)

OTHER PUBLICATIONS

Nov. 18, 2019 Office Action issued in U.S. Appl. No. 16/014,273.
(Continued)

*Primary Examiner* — Ula C Ruddock
*Assistant Examiner* — Sarika Gupta
(74) *Attorney, Agent, or Firm* — Oliff PLC

(57) ABSTRACT

Disclosed is an all-solid-state lithium ion secondary battery excellent in cycle characteristics. The battery may be an all-solid-state lithium ion secondary battery, wherein an anode comprises anode active material particles, an electro-conductive material and a solid electrolyte; wherein the anode active material particles comprise at least one active material selected from the group consisting of elemental silicon and SiO; and wherein a BET specific surface area of the anode active material particles is 1.9 m²/g or more and 14.2 m²/g or less.

11 Claims, 2 Drawing Sheets

(51) Int. Cl.
  *H01M 4/38*     (2006.01)
  *H01M 4/66*     (2006.01)
  *H01M 4/62*     (2006.01)
  *H01M 4/40*     (2006.01)
  *H01M 10/052*   (2010.01)
  *H01M 50/431*   (2021.01)
  *H01M 4/02*     (2006.01)

(52) U.S. Cl.
  CPC .......... *H01M 4/623* (2013.01); *H01M 4/661* (2013.01); *H01M 10/052* (2013.01); *H01M 10/0562* (2013.01); *H01M 50/431* (2021.01); *H01M 2004/021* (2013.01); *H01M 2004/027* (2013.01); *H01M 2004/028* (2013.01); *H01M 2300/0068* (2013.01)

(56) References Cited

U.S. PATENT DOCUMENTS

| | | | |
|---|---|---|---|
| 2007/0292756 A1 | 12/2007 | Tsuchiya | |
| 2011/0065007 A1* | 3/2011 | Kamiya | H01M 10/0562 429/322 |
| 2011/0287317 A1 | 11/2011 | Nakanishi | |
| 2012/0009484 A1 | 1/2012 | Aburatani et al. | |
| 2013/0108923 A1 | 5/2013 | Nakanishi et al. | |
| 2013/0224583 A1* | 8/2013 | Green | H01M 10/0568 429/211 |
| 2013/0302698 A1 | 11/2013 | Goto et al. | |
| 2015/0002101 A1 | 1/2015 | Hasegawa et al. | |
| 2015/0147597 A1 | 5/2015 | Otomo et al. | |
| 2015/0251915 A1 | 9/2015 | Nakanishi et al. | |
| 2015/0270537 A1 | 9/2015 | Kato et al. | |
| 2015/0349378 A1* | 12/2015 | Ose | H01M 4/62 29/623.1 |
| 2016/0111711 A1 | 4/2016 | Koshikawa et al. | |
| 2016/0240850 A1 | 8/2016 | Takamori et al. | |
| 2016/0285085 A1* | 9/2016 | Madden | H01M 4/587 |
| 2016/0329539 A1 | 11/2016 | Kawaji et al. | |
| 2017/0033352 A1 | 2/2017 | Mizutani | |
| 2017/0077732 A1 | 3/2017 | Otaki et al. | |
| 2017/0084913 A1 | 3/2017 | Misaki et al. | |
| 2017/0155256 A1 | 6/2017 | Fujimaki et al. | |
| 2017/0170515 A1 | 6/2017 | Yushin et al. | |
| 2017/0324076 A1 | 11/2017 | Lee et al. | |
| 2017/0352916 A1* | 12/2017 | Miyashita | C01B 25/14 |
| 2018/0254520 A1 | 9/2018 | Maeda | |

FOREIGN PATENT DOCUMENTS

| | | |
|---|---|---|
| CN | 106410129 A | 2/2017 |
| CN | 106816660 A | 6/2017 |
| EP | 3 142 174 A2 | 3/2017 |
| EP | 3 240 089 A1 | 11/2017 |
| JP | 2003-331832 A | 11/2003 |
| JP | 2006-092928 A | 4/2006 |
| JP | 2006-100222 A | 4/2006 |
| JP | 2007-335319 A | 12/2007 |
| JP | 2010-015932 A | 1/2010 |
| JP | 2011-204389 A | 10/2011 |
| JP | 2012-009421 A | 1/2012 |
| JP | 2012-129150 A | 7/2012 |
| JP | 2013-69416 A | 4/2013 |
| JP | 2013-098058 A | 5/2013 |
| JP | 2013-222530 A | 10/2013 |
| JP | 2014-022319 A | 2/2014 |
| JP | 2014-107163 A | 6/2014 |
| JP | 2014-192093 A | 10/2014 |
| JP | 2015-002036 A | 1/2015 |
| JP | 2015-115194 A | 6/2015 |
| JP | 2016-201310 A | 12/2016 |
| JP | 2017-059534 A | 3/2017 |
| KR | 10-2011-0128739 A | 11/2011 |
| KR | 2015-0083851 A | 7/2015 |
| KR | 2016-0020426 A | 2/2016 |
| WO | 2012/099178 A1 | 7/2012 |
| WO | 2016/104702 A1 | 6/2016 |
| WO | 2017/047379 A1 | 3/2017 |

OTHER PUBLICATIONS

Mar. 3, 2020 Office Action issued in U.S. Appl. No. 15/948,123.
Aug. 13, 2020 Office Action issued in U.S. Appl. No. 15/948,123.
Dec. 30, 2020 Office Action issued in U.S. Appl. No. 15/948,123.
Aug. 9, 2021 Notice of Allowance issued in U.S. Appl. No. 15/948,123.
Aug. 7, 2019 Office Action issued in U.S. Appl. No. 15/950,621.
Jan. 22, 2020 Notice of Allowance issued in U.S. Appl. No. 15/950,621.

* cited by examiner

ALL-SOLID-STATE LITHIUM ION SECONDARY BATTERY

TECHNICAL FIELD

The disclosure relates to an all-solid-state lithium ion secondary battery.

BACKGROUND

An active material (an alloy-based active material) containing a metal such as Si, the metal being able to form an alloy with Li, has a large theoretical capacity per volume compared to carbon-based anode active materials. Therefore, a lithium ion battery using such an alloy-based active material in its anode, has been proposed.

Patent Literature 1 discloses a negative electrode mixture for a secondary battery, the mixture comprising, as a negative electrode active material powder, an alloy-based active material having an average particle diameter of 10 μm or less. Patent Literature 1 also discloses an all-solid lithium ion battery comprising an anode layer that contains the negative electrode active material powder.

Patent Literature 1: Japanese Patent Application Laid-Open No. 2013-069416

However, the all-solid-state lithium ion secondary battery as disclosed in Patent Literature 1 which uses an alloy-based active material as an anode active material, shows a low capacity retention rate when it repeats charge-discharge cycles.

SUMMARY

In light of this circumstance, an object of the disclosed embodiments is to provide an all-solid-state lithium ion secondary battery which includes an anode comprising anode active material particles that comprise elemental silicon, and which is excellent in cycle characteristics.

In a first embodiment, there is provided an all-solid-state lithium ion secondary battery, wherein an anode comprises anode active material particles, an electroconductive material and a solid electrolyte; wherein the anode active material particles comprise at least one active material selected from the group consisting of elemental silicon and SiO; and wherein a BET specific surface area of the anode active material particles is 1.9 m$^2$/g or more and 14.2 m$^2$/g or less.

For the all-solid-state lithium ion secondary battery of the first embodiment, a value obtained by dividing, by the BET specific surface area, a volume percentage (%) of the electroconductive material when a volume of the anode is determined as 100 volume %, may be 0.12 or more and 6.03 or less.

In a second embodiment, there is provided an all-solid-state lithium ion secondary battery, wherein an anode is formed by using an anode mixture comprising anode active material particles, an electroconductive material and a solid electrolyte; wherein the anode active material particles comprise at least one active material selected from the group consisting of elemental silicon and SiO; and wherein a BET specific surface area of the anode active material particles is 1.9 m$^2$/g or more and 14.2 m$^2$/g or less.

For the all-solid-state lithium ion secondary battery of the second embodiment, a value obtained by dividing, by the BET specific surface area, a volume percentage (%) of the electroconductive material when a volume of the anode mixture is determined as 100 volume %, may be 0.12 or more and 6.03 or less.

In the disclosed embodiments, the solid electrolyte may be a sulfide-based solid electrolyte.

In the disclosed embodiments, the electroconductive material may be at least one carbonaceous material selected from the group consisting of carbon black, carbon nanotube and carbon nanofiber.

According to the disclosed embodiments, the all-solid-state lithium ion secondary battery can be provided, which includes the anode comprising the anode active material particles that comprise elemental silicon, etc., and which is excellent in cycle characteristics.

DETAILED DESCRIPTION

Figure 1:
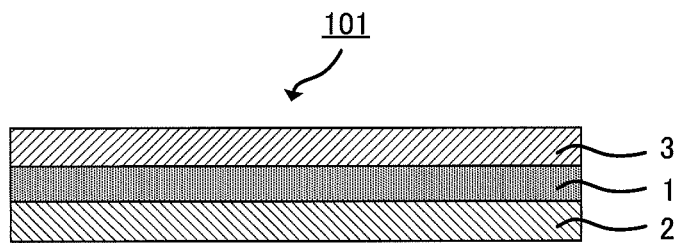
FIG. 1 is a schematic view of an example of the structure of an all-solid-state lithium ion secondary battery.

The all-solid-state lithium ion secondary battery of the first embodiment is an all-solid-state lithium ion secondary battery, wherein an anode comprises anode active material particles, an electroconductive material and a solid electrolyte; wherein the anode active material particles comprise at least one active material selected from the group consisting of elemental silicon and SiO; and wherein a BET specific surface area of the anode active material particles is 1.9 m$^2$/g or more and 14.2 m$^2$/g or less.

The all-solid-state lithium ion secondary battery of the second embodiment is an all-solid-state lithium ion secondary battery, wherein an anode is formed by using an anode mixture comprising anode active material particles, an electroconductive material and a solid electrolyte; wherein the anode active material particles comprise at least one active material selected from the group consisting of elemental silicon and SiO; and wherein a BET specific surface area of the anode active material particles is 1.9 m$^2$/g or more and 14.2 m$^2$/g or less.

The first all-solid-state lithium ion secondary battery (hereinafter it may be simply referred to as the "first embodiment") and the second all-solid-state lithium ion secondary battery (hereinafter it may be simply referred to as the "second embodiment") of the disclosed embodiments are different in the structure of the anode. However, they are similar in other aspects. Accordingly, the first embodiment will be mainly described below, and the second embodiment will be described as needed.

A metal that is able to form an alloy with Li is low in ion conductivity and electron conductivity. Therefore, when the metal is used as an anode active material, generally, a solid electrolyte and an electroconductive material are incorporated in the anode, in combination with the anode active material.

When the metal that is able to form an alloy with Li (hereinafter, the metal that is able to form an alloy with Li may be referred to as M) is used as the anode active material, along with the charging of the lithium ion secondary battery, the reaction represented by the following formula (A), that is, a so-called electrochemical alloying reaction, is initiated in the anode:

$$xLi^{+}+xe^{-}+yM \rightarrow Li_xMy \qquad \text{Formula (A)}$$

Along with the discharging of the lithium ion secondary battery, as represented by the following formula (B), an extraction reaction of Li ions from the alloy of Li and M, is initiated in the anode:

$$Li_xMy \rightarrow xLi^{+}+xe^{-}+yM \qquad \text{Formula (B)}$$

The lithium ion secondary battery using the metal that is able to form an alloy with Li as the anode active material, undergoes a large volume change in association with the Li insertion/extraction reactions represented by the formulae (A) and (B).

In the case where an oxide (MO) of the metal M is used as the anode active material, along with the charging of the lithium ion secondary battery, a metal M may be produced in the anode by the electrochemical reaction represented by the following formula (C):

$$xLi^{+}+xe^{-}+yMO \rightarrow Li_xOy+yM \qquad \text{Formula (C)}$$

By the electrochemical reaction represented by the formula (A) or (B), Li can be inserted in and extracted from the metal M produced from the oxide MO by the formula (C). Therefore, generally, the oxide MO is classified into the category of alloy-based active materials. The oxide MO is similar to the metal M in that it undergoes a large volume change in association with the Li insertion/extraction reactions.

Patent Literature 1 describes that the average particle diameter of a powder of the anode active material may be small because, as the average particle diameter decreases, contact points between the anode active material and the solid electrolyte increase.

However, it was found that in the case of using an alloy-based anode active material such as Si, aggregation of the anode active material particles is likely to occur in the anode, and an electron conducting path in the anode may be blocked; therefore, the capacity retention rate of the battery may deteriorate especially at the initial stage.

The electron conducting path in the anode is mainly formed by surface contact between the anode active material particles, which is responsible for the reactions represented by the formulae (A) and (B), and the electroconductive material in the anode. Along with the Li insertion/extraction reactions, the volume of the anode active material particles changes and due to intense expansion and contraction of the anode active material particles, there is a problem in that surface contact with the adjacent electroconductive material is not stably ensured. If the surface contact between the anode active material particles and the electroconductive material is uneven in the anode, the electron conducting path is narrowed in the area where the surface contact is small.

As just described, in the area where the electron conducting path is narrow, the electron conducting path is gradually cut by repeating the expansion and contraction of the anode active material particles in association with charging and discharging. As a result, it is considered that the capacity retention rate of the lithium ion secondary battery deteriorates.

In the all-solid-state lithium ion secondary battery of the disclosed embodiments, by using the anode active material particles having a BET specific surface area in the above-mentioned range, sufficient contact between the anode active material particles and the electroconductive material can be ensured, while maintaining excellent ion conductivity. Therefore, it is considered that the capacity retention rate can be kept high.

Hereinafter, the all-solid-state lithium ion secondary battery of the disclosed embodiments will be described in detail.

1. ALL-SOLID-STATE LITHIUM ION SECONDARY BATTERY

The structure of the all-solid-state lithium ion secondary battery of the disclosed embodiments is not particularly limited, as long as the battery functions as a secondary battery. As shown in FIG. 1, typically, the all-solid-state lithium ion secondary battery of the disclosed embodiments comprises a cathode 2, an anode 3 and a solid electrolyte layer 1 disposed between the cathode 2 and the anode 3, which form a cathode-solid electrolyte layer-anode assembly 101. The cathode-solid electrolyte layer-anode assembly 101 is an assembly of members having the following array structure: the cathode, the solid electrolyte layer and the anode are arranged in this order; they may be directly attached or indirectly attached through a part composed of a different material; and a part composed of a different material may be attached to one or both of the opposite side of the cathode to the position where the solid electrolyte layer is present (the outer side of the cathode) and the opposite side of the anode to the position where the solid electrolyte layer is present (the outer side of the anode).

By attaching other members such as a current collector to the cathode-solid electrolyte layer-anode assembly 101, a cell, which is a functional unit of an all-solid-state battery, is obtained. The cell can be used as it is as an all-solid-state lithium ion secondary battery, or a plurality of the cells can be electrically connected to form a cell assembly and used as the all-solid-state lithium ion secondary battery of the disclosed embodiments.

The all-solid-state lithium ion secondary battery is characterized as follows: as shown in FIG. 1, it does not include an electrolyte solution in a liquid phase, unlike the structure of a widely used lithium ion secondary battery comprising a non-aqueous electrolyte. That is, the all-solid-state lithium ion secondary battery of the disclosed embodiments largely and structurally differs in that, the electrolyte is in a solid phase, and the electrolyte in a solid phase is electrochemically connected to the cathode in a solid phase and the anode in a solid phase.

1-1. Anode

In the first embodiment, the anode comprises anode active material particles, an electroconductive material and a solid electrolyte.

In the second embodiment, the anode is formed by using an anode mixture comprising anode active material particles, an electroconductive material and a solid electrolyte.

The anodes of the disclosed embodiments are similar in that they comprise anode active material particles, an electroconductive material and a solid electrolyte.

Accordingly, these materials for the anode will be described first, and then the anode mixture used in the second embodiment will be described below under "2-1. Anode mixture".

(Anode Active Material Particles)

The anode active material particles comprise at least one active material selected from the group consisting of elemental silicon and SiO.

When the anode active material comprises elemental silicon, Si can inserts/extracts Li ions along with the so-called electrochemical alloying reactions represented by the formulae (A) and (B) (in these formulae, M is Si).

On the other hand, when the anode active material comprises SiO, elemental silicon is produced by the electrochemical reaction represented by the formula (C) (in this formula, M is Si). Therefore, the electrochemical alloying reaction progresses continuously.

Also, the BET specific surface area of the anode active material particles is 1.9 m$^2$/g or more and 14.2 m$^2$/g or less. When the BET specific surface area is in this range, the contact area of the anode active material particles is small and makes the particles less likely to aggregate. As a result, the dispersibility of the anode active material particles in the anode increases, and the anode active material particles are brought into surface contact with the electroconductive material, thereby ensuring the electron conducting path in the anode. Therefore, the capacity retention rate increases. In addition, when the BET specific surface area is in this range, an ion conducting path that is a contact point between the anode active material particles and the solid electrolyte, can be ensured, and excellent anode performance can be obtained.

Therefore, by setting the BET specific surface area of the anode active material particles to 1.9 m$^2$/g or more and 14.2 m$^2$/g or less, the electron conducting path is maintained, while maintaining the ion conducting path in the anode, and the all-solid-state lithium ion secondary battery can keep excellent cycle characteristics.

To maintain the ion conducting path and the electron conducting path with balance, the BET specific surface area of the anode active material particles may be 2.2 m$^2$/g or more and 13.9 m$^2$/g or less, or it may be 2.5 m$^2$/g or more and 13.0 m$^2$/g or less.

In the disclosed embodiments, the BET specific surface area (m$^2$/g) of the anode active material particles may be a commonly known value (e.g., a catalog value) or a measured value. The BET specific surface area (m$^2$/g) of the anode active material particles can be measured by a specific surface area measuring machine (product name: NOVA e2000, manufactured by: Quantachrome Instruments Japan G. K.), for example.

The percentage of the anode active material in the anode is not particularly limited. For example, it may be 40 mass % or more, may be in a range of from 50 mass % to 90 mass %, or may be in a range of from 50 mass % to 70 mass %.

The form of the elemental silicon and SiO is not particularly limited. As the form, examples include, but are not limited to, a particle form and a film form.

The BET specific surface area of the anode active material particles may be in the above range, at least in the all-solid-state lithium ion secondary battery before passing electricity therethrough. Even after the production of the battery, the BET specific surface area of the anode active material particles is not largely changed, as long as the battery is charged and discharged only a few times. For example, if the produced battery is charged and discharged as a trial before it is shipped out as a commercial product, at least 70% to 80% of the anode active material particles in the anode are considered to have a BET specific surface area in the above range.

The anode active material particles may contain a substance that is obtained by carrying out a Li pre-doping treatment on at least one selected from the group consisting of elemental silicon and SiO, both of which satisfy the above condition. By using such anode active material particles, the irreversible capacity of the anode can be decreased. The method for the Li pre-doping treatment is not particularly limited, as long as it is a commonly used method. As the method, examples include, but are not limited to, an electrochemical method, a thermal reaction method and an organic Li immersion method.

Also, the anode active material particles may contain a substance that is obtained by carrying out a surface conductive treatment on at least one selected from the group consisting of elemental silicon and SiO, both of which satisfy the above condition. By using such anode active material particles, the electron conducting path in the anode can be maintained in a better state. The method for the surface conductive treatment is not particularly limited, as long as it is a commonly used method. As the method, examples include, but are not limited to, carbon coating.

The median diameter D50 of the anode active material particles may be from 0.1 μm to 6.0 μm. The median diameter means such a diameter that the accumulated volume of the particles is a half (50%) of the whole volume when the particle diameters of the particles are arranged in ascending order. By using the anode active material particles having a median diameter D50 of from 0.1 μm to 6.0 μm, the dispersibility of the anode active material particles can be increased, while maintaining contact points between the anode active material and the solid electrolyte. The particle diameter of the anode active material particles may be from 2.4 μm to 5.6 μm.

The median diameter D50 (μm) of the anode active material particles can be measured by a dynamic light scattering (DLS) particle size distribution measuring machine (product name: Nanotrac Wave, manufactured by: MicrotracBEL Corp.), for example.

(Solid Electrolyte)

The solid electrolyte in the anode may be a crystalline material or a non-crystalline material. The solid electrolyte is not particularly limited, as long as it is a solid electrolyte that is applicable to the all-solid-state lithium ion secondary battery. As the solid electrolyte, for example, an oxide-based solid electrolyte (an oxide-based non-crystalline solid electrolyte and an oxide-based crystalline solid electrolyte), a sulfide-based solid electrolyte (a sulfide-based non-crystalline solid electrolyte and a sulfide-based crystalline solid electrolyte), a crystalline oxide and a crystalline nitride, all of which have high Li ion conductivity, may be used. The solid electrolyte material may be glass, for example, and it may be crystallized glass (glass ceramic).

As the oxide-based non-crystalline solid electrolyte, examples include, but are not limited to, $Li_2O$—$B_2O_3$—$P_2O_3$ and $Li_2O$—$SiO_2$. As the sulfide-based non-crystalline solid electrolyte, examples include, but are not limited to, $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $Li_2S$—$P_2S_5$, and $LiI$—$LiBr$—$Li_2S$—$P_2S_5$. As the crystalline oxide and the crystalline nitride, examples include, but are not limited to, $LiI$, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_w$ (w<1), and $Li_{3.6}Si_{0.6}P_{0.4}O_4$.

The percentage of the solid electrolyte in the anode is not particularly limited. For example, it may be 10 mass % or more, may be in a range of from 20 mass % to 50 mass %, or may be in a range of from 25 mass % to 45 mass %.

The ratio of the anode active material to the solid electrolyte in the anode may be as follows: when the total mass of the two kinds of materials is determined as 100 mass %, the ratio of the anode active material (mass %) to the solid electrolyte (mass %) may be from 85:15 to 30:70, or it may be from 80:20 to 40:60.

(Electroconductive Material)

The electroconductive material is not particularly limited, as long as it is an electroconductive material that is, in the anode, applicable to the all-solid-state lithium ion secondary battery. As the raw material for the electroconductive material, examples include, but are not limited to, at least one carbonaceous material selected from the group consisting of carbon black (e.g., acetylene black, Ketjen Black and furnace black), carbon nanotube and carbon nanofiber.

From the viewpoint of electron conductivity, the raw material may be at least one carbonaceous material selected from the group consisting of carbon nanotube and carbon nanofiber. The carbon nanotube and carbon nanofiber may be vapor-grown carbon fiber (VGCF).

The percentage of the electroconductive material in the anode is not particularly limited. For example, it may be 1.0 mass % or more, may be in a range of from 1.0 mass % to 12 mass %, or may be in a range of from 2.0 mass % to 10.0 mass %.

In addition to the above-mentioned components, the anode may contain other components such as a binder.

As the binder, examples include, but are not limited to, polyvinylidene fluoride (PVdF), polytetrafluoroethylene (PTFE), butylene rubber (BR), amine-modified butylene rubber (ABR), styrene-butadiene rubber (SBR), polyvinyl butyral (PVB) and acrylic resin. The binder may be polyvinylidene fluoride (PVdF).

Since a high energy density is obtained, the anode of the disclosed embodiments may be an anode in which the volume percentage of components other than the anode active material, is small.

In the first embodiment, from the viewpoint of increasing the dispersibility of the anode active material particles in the anode and thus increasing the durability of the all-solid-state battery, the value obtained by dividing, by the BET specific surface area of the anode active material particles, the volume percentage (%) of the electroconductive material when the volume of the anode is determined as 100 volume %, may be 0.12 or more and 6.03 or less. Hereinafter, the value obtained by dividing the volume percentage of the electroconductive material by the BET specific surface area of the anode active material particles, may be referred to as "C/S value".

In the disclosed embodiments, the volume percentage of each material in the anode is a value calculated from the true density of the material. In the calculation of the volume percentage, spaces in the anode are not taken into account.

In the second embodiment, the volume percentage (%) of the electroconductive material which is needed to calculate the C/S value, is a value when the volume of the below-described anode mixture is determined as 100 volume %.

In the disclosed embodiments, the C/S value is an index of balance between the volume percentage of the electroconductive material in the anode and the BET specific surface area of the anode active material particles. When the C/S value is too low or too high, the following problem occurs.

The case where the C/S value is less than 0.12 means a case where the BET specific surface area is too high compared to the volume percentage of the electroconductive material in the anode. As the case, examples include, but are not limited to, a case where many spaces are produced in the anode since the volume percentage of the electroconductive material is too low, and a case where the contact area between the anode active material particles is large since the BET specific surface area is large. Of these examples, in the case where many spaces are produced in the anode, the area where the anode active material particles are distributed is limited; therefore, the anode active material particles may be unevenly distributed. In the case where the contact area between the anode active material particles is large, the anode active material particles may easily aggregate. Therefore, in any of the cases, the anode active material particles may be unevenly distributed and, as a result, may narrow the electron conducting path in the area where the amount of the anode active material particles is small, which may lead to a decrease in capacity retention rate.

On the other hand, when the C/S value is more than 6.03, the volume percentage of the electroconductive material in the anode is too high. Therefore, a problem occurs in the ion conducting path, rather than the electron conducting path in the anode, and may result in an increase in resistance.

To maintain the ion conducting path and the electron conducting path with balance, the C/S value may be 0.70 or more and 5.00 or less, or it may be 0.66 or more and 4.11 or less.

By calculating the volume percentage of the electroconductive material and the BET specific surface area of the anode active material particles in advance, a rough prediction can be made on the balance between the ion conducting path and the electron conducting path in the anode to be obtained.

For example, when the anode active material particles having a large BET specific surface area are used, the C/S value may be 0.12 or more and 6.03 or less, as long as the anode contains a sufficient amount of the electroconductive material. As a result, it can be predicted that the anode contains both the ion conducting path and the electron conducting path with balance.

Also, for example, when the amount of the electroconductive material in the anode is decreased, the C/S value may be 0.12 or more and 6.03 or less, as long as the anode active material particles having a small BET specific surface area is used. As a result, it can be predicted that the anode in which, as with the above case, both the ion conducting path and the electron conducting path are contained with balance, is obtained.

By referring to the C/S value, the volume percentage of the electroconductive material can be determined depending on the BET specific surface area of the anode active material particles used. Therefore, an all-solid-state lithium ion secondary battery that is less likely to cause a decrease in capacity, can be produced.

The average thickness of the anode may be from 1 μm to 100 μm, or it may be from 30 μm to 100 μm.

The average thickness of each of the layers constituting the all-solid-state lithium ion secondary battery of the disclosed embodiments, is a value obtained by measuring the thicknesses of 3 to 10 points of a target layer with an electron microscope or the like, and then averaging the measurement results.

The anode may comprise an anode current collector.

As the anode current collector, for example, copper and a copper alloy can be used. Copper may be plated with Ni, Cr, C or the like, or Ni, Cr, C or the like may be deposited on copper.

1-2. Cathode

The cathode is not particularly limited, as long as it is a cathode that functions as the cathode of the all-solid-state lithium ion secondary battery. In general, the cathode contains a Li-containing cathode active material. As needed, the cathode contains other components such as a binder, a solid electrolyte, an electroconductive material and a thickener.

In the disclosed embodiments, the Li-containing cathode active material is not particularly limited, as long as it is an active material that contains a Li element. A substance can be used as the cathode active material without particular limitation, as long as it functions as the cathode active material in an electrochemical reaction in relation to the anode active material, and it promotes an electrochemical reaction that involves Li ion transfer. Also, a substance that is known as the cathode active material of a lithium ion battery, can be used in the disclosed embodiments.

The raw material for the cathode active material is not particularly limited, as long as it is a raw material that is applicable to the all-solid-state lithium ion secondary battery. As the raw material, examples include, but are not limited to, lithium cobaltate ($LiCoO_2$), lithium nickelate ($LiNiO_2$), lithium manganate ($LiMn_2O_4$), a different element-substituted Li—Mn spinel of the composition represented by $Li_{1+x}Ni_{1/3}Mn_{1/3}Co_{1/3}O_2$, $Li_{1+x}Mn_{2-x-y}M_yO_4$ (where M is one or more elements selected from Al, Mg, Co, Fe, Ni and Zn), lithium titanate ($Li_xTiO_y$) and lithium metal phosphate ($LiMPO_4$ where M=Fe, Mn, Co, Ni, etc.)

The cathode active material may include a coating layer which has lithium ion conductivity and which contains a substance that is not fluidized even when it is in contact with the active material or solid electrolyte. As the substance, examples include, but are not limited to, $LiNbO_3$, $Li_4TiO_{12}$ and $Li_3PO_4$.

The form of the cathode active material is not particularly limited. It may be a film form or particle form.

The percentage of the cathode active material in the cathode is not particularly limited. For example, it may be 60 mass % or more, may be in a range of from 70 mass % to 95 mass %, or may be in a range of from 80 mass % to 90 mass %.

The cathode may comprise a cathode current collector.

As the cathode current collector, for example, SUS, Ni, Cr, Au, Pt, Al, Fe, Ti, Zn, etc., can be used. These materials may be plated with Ni, Cr, C or the like, or Ni, Cr, C or the like may be deposited on the materials.

The raw material for the solid electrolyte used in the cathode is not particularly limited, as long as it is a raw material that is applicable to the all-solid-state lithium ion secondary battery. As with the raw material for the solid electrolyte used in the anode, an oxide-based solid electrolyte (an oxide-based non-crystalline solid electrolyte and an oxide-based crystalline solid electrolyte), a sulfide-based solid electrolyte (a sulfide-based non-crystalline solid electrolyte and a sulfide-based crystalline solid electrolyte), a crystalline oxide, a crystalline nitride or the like, all of which have high Li ion conductivity, may be used as the raw material for the solid electrolyte used in the cathode.

The ratio of the cathode active material to the solid electrolyte in the cathode may be as follows: when the total mass of the two kinds of materials is determined as 100 mass %, the ratio of the cathode active material (mass %) to the solid electrolyte (mass %) may be from 90:10 to 30:70, or it may be from 80:20 to 50:50.

As the raw material for the electroconductive material and the raw material for the binder, the same materials as those used in the anode, can be used.

The average thickness of the cathode may be from 1 μm to 100 μm, or it may be from 30 μm to 100 μm.

1-3. Solid Electrolyte Layer

The solid electrolyte layer is not particularly limited, as long as it is a solid electrolyte layer that functions as the solid electrolyte layer of the all-solid-state lithium secondary battery. In general, the solid electrolyte layer contains a solid electrolyte raw material. As needed, it contains other components such as a binder.

As the raw material for the solid electrolyte and the raw material for the binder, the same materials as those used in the anode, can be used.

The percentage of the solid electrolyte raw material in the solid electrolyte layer is not particularly limited. For example, it may be 50 mass % or more, may be in a range of from 70 mass % to 99.99 mass %, or may be in a range of from 90 mass % to 99.9 mass %.

The average thickness of the solid electrolyte layer may be from 0.1 μm to 300 μm, or it may be from 0.1 μm to 100 μm.

2. METHOD FOR PRODUCING THE ALL-SOLID-STATE LITHIUM ION SECONDARY BATTERY

The method for producing the all-solid-state lithium ion secondary battery is not particularly limited, as long as it is a method by which the all-solid-state lithium ion secondary battery of the disclosed embodiments can be produced. For example, the all-solid-state lithium ion secondary battery of the disclosed embodiments can be obtained by disposing a solid electrolyte material part between a cathode mixture and an anode mixture that contains an anode active material, an electroconductive material and a solid electrolyte.

By passing electricity through the all-solid-state lithium ion secondary battery, the electrochemical alloying reaction as represented by the formula (A) is initiated. As a result, the elemental silicon in the anode active material reacts with lithium ions to produce an alloy of the elemental silicon and Li.

The method for passing electricity through the all-solid-state lithium ion secondary battery is not particularly limited. To efficiently promote the electrochemical alloying reaction as represented by the formula (A), current density may be in a range of from 0.1 $mA/cm^2$ to 6.0 $mA/cm^2$, or voltage may be in a range of from 4.1 V to 4.7 V (vs Li/Li*).

Hereinafter, the anode mixture, the cathode mixture, the solid electrolyte material part and the all-solid-state lithium ion secondary battery will be described.

2-1. Anode Mixture

The anode mixture comprises anode active material particles, an electroconductive material and a solid electrolyte. The anode active material particles are not particularly limited, as long as the anode active material particles comprise at least one active material selected from the group consisting of elemental silicon and SiO, and the BET specific surface area of the anode active material particles is 1.9 $m^2/g$ or more and 14.2 $m^2/g$ or less. The anode mixture and an anode produced from the anode mixture can keep such a state that, inside thereof, the anode active material particles are evenly dispersed and surface contact between the anode active material particles and the electroconductive material is ensured with no unevenness.

As needed, the anode mixture may contain other components such as a binder, in addition to the anode active material particles, the electroconductive material and the solid electrolyte.

As the raw materials for the components such as the anode active material particles, the electroconductive material, the solid electrolyte and the binder, which is a component incorporated as needed, the same raw materials as those exemplified in the above "1-1. Anode" can be used.

The raw material for forming the anode mixture, that is, the raw material for the anode mixture, may contain components other than the raw materials for the anode active material particles, the electroconductive material, the solid electrolyte and the binder, which is incorporated as needed. In addition, the raw material for the anode mixture may contain components that are removed in the process of forming the anode mixture. As the components that are contained in the raw material for the anode mixture and removed in the process of forming the anode mixture, examples include, but are not limited to, a solvent and a removable binder. As the removable binder, such a binder can be used, that functions as the binder in the formation of the anode mixture and is decomposed or volatilized and removed by sintering in the step of obtaining the anode mixture, thereby providing a binder-free anode mixture.

The method for forming the anode mixture is not particularly limited. This is because, by using the anode active material particles which comprise at least one active material selected from the group consisting of elemental silicon and SiO and which have a BET specific surface area of 1.9 $m^2/g$ or more and 14.2 $m^2/g$ or less, in the anode mixture thus formed and the anode produced from the anode mixture, the anode active material particles can be kept in an evenly dispersed state, and surface contact between the anode active material particles and the electroconductive material is ensured with no unevenness.

As the method for forming the anode mixture, examples include, but are not limited to, a method for compression-forming a powder of the raw material for the anode mixture. In the case of compression-forming the powder of the raw material for the anode mixture, generally, a pressing pressure of from about 400 MPa to about 1,000 MPa is applied. The compression-forming may be carried out by using a roll press. In this case, a line pressure may be set to 10 kN/cm to 100 kN/cm. Also, the compression-forming may be carried out after the powder is heated in advance. The powder heating temperature may be from 60° C. to 250° C.

Also, the following methods can be adopted: a method in which a powder of the raw material for the anode mixture containing the removable binder, is subjected to compression forming and then sintered to remove the binder, and a method in which a dispersion of the raw material for the anode mixture containing the solvent and the removable binder, is applied on the solid electrolyte material part or on a different support, dried, formed into the anode mixture and then sintered to remove the binder.

In the second embodiment, the anode is formed by using an anode mixture comprising anode active material particles, an electroconductive material and a solid electrolyte. The anode mixture used herein means the above-mentioned anode mixture.

The value (the C/S value) obtained by dividing, by the BET specific surface area of the anode active material particles, the volume percentage (%) of the electroconductive material when the volume of the anode mixture is determined as 100 volume %, may be 0.12 or more and 6.03 or less. The reason why the C/S value may be in this range is the same as the reason described above in "1-1. Anode".

2-2. Cathode Mixture

In the production method of the disclosed embodiments, the cathode mixture contains, for example, a Li-containing cathode active material. As needed, it contains other raw materials such as a binder, a solid electrolyte and an electroconductive material.

As the other raw materials such as the binder, the electroconductive material and the solid electrolyte, the same raw materials as those exemplified above in "1-2. Cathode" can be used.

The raw material for forming the cathode mixture, that is, the raw material for the cathode mixture may further contain components that are removed in the process of forming the cathode mixture. As the components that are contained in the raw material for the cathode mixture and removed in the process of forming the cathode mixture, examples include, but are not limited to, the same components as the solvent and the removable binder, both of which can be incorporated in the raw material for the anode mixture.

As the method for forming the cathode mixture, examples include, but are not limited to, the same method as the method for forming the anode mixture.

2-3. Solid Electrolyte Material Part

In the production method of the disclosed embodiments, the solid electrolyte material part contains a solid electrolyte raw material, for example. As needed, it contains other components.

As the solid electrolyte raw material, the same materials as those exemplified above in "1-3. Solid electrolyte layer" can be used.

The percentage of the solid electrolyte raw material in the solid electrolyte material part is not particularly limited. For example, it may be 50 mass % or more, may be in a range of from 70 mass % to 99.99 mass %, or may be in a range of from 90 mass % to 99.9 mass %.

As the other components contained in the solid electrolyte material part, the same materials as those exemplified above in "1-3. Solid electrolyte layer" can be used.

As the method for forming the solid electrolyte material part, examples include, but are not limited to, a method for compression-forming a powder of the solid electrolyte material containing the solid electrolyte raw material and, as needed, other components. In the case of compression-forming the powder of the solid electrolyte material, generally, as with the case of compression-forming the powder of the anode mixture, a pressing pressure of from about 400 MPa to about 1,000 MPa is applied. The compression-forming may be carried out by using a roll press. In this case, a line pressure may be set to 10 kN/cm to 100 kN/cm. Also, the compression-forming may be carried out after the powder is heated in advance. The powder heating temperature may be from 60° C. to 250° C.

As a different method, a cast film forming method can be used, which uses a solution or dispersion of the solid electrolyte material that contains the solid electrolyte raw material and, as needed, other components.

2-4. All-Solid-State Lithium Ion Secondary Battery

In the production method of the disclosed embodiments, the all-solid-state lithium ion secondary battery of the disclosed embodiments is an assembly of members having the following array structure, for example: the cathode mixture, the solid electrolyte material part and the anode mixture are arranged in this order; they may be directly attached or indirectly attached through a part composed of a different material; and a part composed of a different material may be attached to one or both of the opposite side of the cathode mixture to the position where the solid electrolyte material part is present (the outer side of the cathode mixture) and the opposite side of the anode mixture to the position where the solid electrolyte material part is present (the outer side of the anode mixture) (i.e., a cathode mixture-solid electrolyte material part-anode mixture assembly).

A part composed of a different material may be attached to the all-solid-state lithium ion secondary battery, as long as Li ions can be passed in the direction from the cathode mixture side to the anode mixture side through the solid electrolyte material part. A coating layer such as $LiNbO_3$, $Li_4TiO_{12}$ or $Li_3PO_4$ may be disposed between the cathode mixture and the solid electrolyte material part. A current collector, an outer casing, etc., may be attached to one or both of the outer side of the cathode mixture and the outer side of the anode mixture.

The all-solid-state lithium ion secondary battery is typically an assembly having the following array structure: the cathode mixture, the anode mixture and the solid electrolyte material part disposed between the cathode mixture and the anode mixture are directly attached, and a part composed of a different material is not attached to both the outer side of the cathode mixture and the outer side of the anode mixture.

The method for producing the all-solid-state lithium ion secondary battery is not particularly limited. For example, the all-solid-state lithium ion secondary battery may be produced as follows: the powder of the raw material for the anode mixture is put in a compression cylinder for powder compression forming and deposited to a uniform thickness, thereby forming a layer of the powder of the raw material for the anode mixture; a powder of the raw material for the solid electrolyte, which contains the solid electrolyte powder and, as needed, other components, is placed on the layer of the powder of the raw material for the anode mixture and deposited to a uniform thickness, thereby forming a layer of the powder of the raw material for the solid electrolyte; a powder of the raw material for the cathode mixture, which contains the Li-containing cathode active material, is placed on the layer of the powder of the raw material for the solid electrolyte and deposited to a uniform thickness, thereby forming a layer of the powder of the raw material for the cathode mixture; and a powder deposit composed of the three powder deposited layers formed in this manner, is subjected to compression-forming at once, thereby producing the all-solid-state lithium ion secondary battery.

The solid electrolyte material part, the anode mixture and the cathode mixture may be produced by a method other than the powder compression forming. Details of the method are as described above. For example, the solid electrolyte material part may be formed by the cast film forming method or a coating method with a die coater, using the solution or dispersion of the solid electrolyte material containing the solid electrolyte raw material. The anode mixture and the cathode mixture may be formed by the following method, for example: a method in which the dispersion containing the powder of the raw material for the anode mixture or cathode mixture and the removable binder, is applied on the solid electrolyte material part to form a coating film, and the coating film is heated to remove the binder from the coating film, or a method in which the powder containing the raw material for the anode mixture or cathode mixture and the removable binder, is subjected to compression forming to form the powder into the cathode mixture or anode mixture, and the thus-formed product is heated to remove the binder from the product. To increase electrode density, the anode mixture and the cathode mixture may be subjected to densification pressing in advance before the compression forming.

The anode mixture and the cathode mixture may be formed on a support other than the solid electrolyte material part. In this case, the anode mixture and the cathode mixture are removed from the support, and the removed anode mixture or cathode mixture is attached on the solid electrolyte material part.

The all-solid-state lithium ion secondary battery is generally confined at a predetermined confining pressure using a confining jig, and then it is charged and discharged. At this time, the method for confining the all-solid-state lithium ion secondary battery is not particularly limited. As the confining method, examples include, but are not limited to, a confining method using the confining torque of a bolt.

An example of the method for calculating the discharge capacity retention rate of the all-solid-state lithium ion secondary battery according to the disclosed embodiments, will be described below.

First, the battery is charged with constant current-constant voltage until a predetermined voltage is reached. Next, the charged battery is discharged with constant current-constant voltage. The charging and discharging are determined as one cycle, and X cycles are repeated.

The discharge capacity retention rate after X cycles is calculated by the following formula (D):

$$r=(C_X/C_{1st})\times 100 \qquad \text{Formula (D)}$$

where r is the discharge capacity retention rate (%) after X cycles; $C_X$ is the discharge capacity (mAh) at the X-th cycle; and $C_{1st}$ is the discharge capacity (mAh) at the first cycle. The value of X is not particularly limited; however, since the initial discharge capacity retention rate is easily influenced by uneven distribution of the anode active material particles in the anode, X may be 10 or less, or it may be 5.

For the all-solid-state lithium ion secondary battery using the alloy-based anode active material, a difference in capacity retention rate after initial charging and discharging, determines future durability. For example, according to a comparison between Example 3 and Comparative Example 1 described below, there is a difference of as much as 0.2% in the capacity retention rate just after 5 cycles. Since the difference of 0.2% in the capacity retention rate after initial charging and discharging, increases with cycles, it can be said that Comparative Example 1 has a serious defect compared to Example 3.

For example, in the case where the all-solid-state lithium ion secondary battery is mounted in a car, when one or two cycles of charging and discharging of the battery are carried out per week and the battery is used for 10 years before replacement, 500 to 1000 cycles of charging and discharging are repeated.

For example, in the case where there is a difference of 0.2% in the capacity retention rate after 5 cycles of charging and discharging, when a deterioration phenomenon, which is a cause for capacity decrease, is continuously caused by charging and discharging cycles, the capacity retention rate is estimated to be 60% in Comparative Example 1 and 78% in Example 3, even just after 50 cycles of charging and discharging. Therefore, the difference between them is increased to 18%. Considering that there is a demand for the above-described secondary battery that has high durability and is prepared for long-term use, even if the difference in the capacity retention rate after 5 cycles of charging and discharging is 0.2%, this will be a large significant difference. The reason for this is presumed as follows: due to expansion and contraction of the anode active material, which are caused by repeating charging and discharging cycles, electrical connection between the anode active material and the electroconductive material inside the anode and electrochemical connection between the anode surface and the solid electrolyte layer gradually decrease, thereby decreasing the capacity retention rate.

Also, the following fact was actually confirmed: for example, in the case where an acceleration test was continuously carried out under a high temperature condition, the difference in the capacity retention rate after 5 cycles becomes a much larger difference with cycles. The reason for this is presumed as follows: deterioration in the anode active material is accelerated with cycles, and initial deterioration in the anode active material accounts for about 1% to 1.5% of overall deterioration.

For example, for deterioration in the anode active material relating to cutting of the electron conducting path, it is presumed as follows: once the electron conducting path is cut, reaction is concentrated in one part and results in an increase in volume change amount of the anode active material per unit volume of Si; therefore, cutting of the electron conducting path more easily progresses. As a result, deterioration in the anode active material more easily progresses with cycles, compared to the time of the initial cycles.

As the initial deterioration, examples include, but are not limited to, deterioration in components other than the anode, such as deterioration in the cathode and deterioration in the solid electrolyte layer. They are only about 1% to 1.5% in total. Therefore, when the initial capacity retention rate is below 98.5%, it is considered that deterioration in the anode active material is in progress. When deterioration occurs at the 5th cycle in the initial stage, it is considered that deterioration continuously progresses thereafter and leads to a large decrease in capacity.

Examples

Hereinafter, the disclosed embodiments will be further clarified by the following examples. The disclosed embodiments are not limited to the following examples, however.

1. Production of Si Particles

Production Example 1

Lump silicon metal (chemical grade silicon manufactured by Simcoa Operations) was used as a raw material and roughly pulverized with a roll crusher mill (product name: MRCW1, manufactured by: Makino Corporation). A roughly pulverized powder thus obtained was further pulverized finely and classified with a cross jet mill (product name: KJ-25, manufactured by: Kurimoto, Ltd.) at a separator rotational frequency of 125 Hz. Then, Si particles were collected from a collection container under a cyclone.

By the above process, the Si particles of Production Example 1 were obtained, which had a BET specific surface area of 1.9 $m^2/g$ and a median diameter D50 of 5.3 μm.

Production Example 2

Si particles of Production Example 2 were obtained in the same manner as Production Example 1, except that the lump silicon metal (chemical grade silicon manufactured by Simcoa Operations) used as the raw material was changed to granular polycrystalline silicon (solar-grade silicon manufactured by REC Silicon). The Si particles of Production Example 2 had a BET specific surface area of 2.20 $m^2/g$ and a median diameter D50 of 5.2 μm.

Production Example 3

Si particles of Production Example 3 were obtained in the same manner as Production Example 2, except that the separator rotational frequency of the cross jet mill was changed to 300 Hz. The Si particles of Production Example 3 had a BET specific surface area of 3.4 $m^2/g$ and a median diameter D50 of 2.5 μm.

Production Example 4

Granular polycrystalline silicon (solar-grade silicon manufactured by REC Silicon) was used as a raw material and roughly pulverized with the roll crusher mill (product name: MRCW1, manufactured by: Makino Corporation). A roughly pulverized powder thus obtained was further pulverized finely and classified with the cross jet mill (product name: KJ-25, manufactured by: Kurimoto, Ltd.) at a separator rotational frequency of 300 Hz. Then, Si particles were collected from a collection container under a bag filter.

By the above process, the Si particles of Production Example 4 were obtained, which had a BET specific surface area of 13.9 $m^2/g$ and a median diameter D50 of 0.2 μm.

Production Example 5

Lump silicon metal (chemical grade silicon manufactured by Simcoa Operations) was used as a raw material and roughly pulverized with the roll crusher mill (product name: MRCW1, manufactured by: Makino Corporation). A roughly pulverized powder thus obtained was further pulverized finely and classified with the cross jet mill (product name: KJ-25, manufactured by: Kurimoto, Ltd.) at a separator rotational frequency of 300 Hz. Then, Si particles were collected from the collection container under the bag filter.

By the above process, the Si particles of Production Example 5 were obtained, which had a BET specific surface area of 14.2 $m^2/g$ and a median diameter D50 of 0.2 μm.

Production Example 6

Si particles of Production Example 6 were obtained in the same manner as Production Example 2, except that the separator rotational frequency of the cross jet mill was changed to 123 Hz. The Si particles of Production Example 6 had a BET specific surface area of 2.19 $m^2/g$ and a median diameter D50 of 5.5 μm.

Comparative Production Example 1

A copper crucible was placed inside a vacuum chamber equipped with an oil diffusion pump. Lump silicon metal (8 kg) was put in the copper crucible. Then, the inside of the chamber was depressurized to $2 \times 10^{-4}$ Pa. Next, the silicon metal lump was melted by an axial electron gun placed in the chamber. After melting the silicon metal lump, with controlling the temperature of a deposition substrate made of stainless steel to 300° C., deposition of copper was carried out for 7 hours at a power density of 1.0 $kW/cm^2$. Then, the temperature inside the chamber was naturally cooled to normal temperature. Thereafter, the chamber was opened to the air, and a silicon deposit (0.8 kg) was obtained.

The thus-obtained silicon deposit was used as a raw material and roughly pulverized with the roll crusher mill (product name: MRCW1, manufactured by: Makino Corporation). A roughly pulverized powder thus obtained was further pulverized finely and classified with the cross jet mill (product name: KJ-25, manufactured by: Kurimoto, Ltd.) at a separator rotational frequency of 300 Hz. Then, Si particles were collected from the collection container under the bag filter.

By the above process, the Si particles of Comparative Production Example 1 were obtained, which had a BET specific surface area of 21.7 $m^2/g$ and a median diameter D50 of 0.3 µm.

Reference Production Example 1

SIE22PB (manufactured by Kojundo Chemical Laboratory Co., Ltd.) was used as Si particles of Reference Production Example 1. The Si particles of Reference Production Example 1 had a BET specific surface area of 2.11 $m^2/g$ and a median diameter D50 of 5.5 µm.

2. Production of all-Solid-State Lithium Ion Secondary Battery

Example 1

(1) The Step of Forming Anode Mixture

The following raw materials for an anode were put in a container.
Anode active material particles: The Si particles of Production Example 1
Sulfide-based solid electrolyte: $Li_2S$—$P_2S_5$-based glass ceramic
Electroconductive material: VGCF
Binder: 5 Mass % butyl butyrate solution of a PVdF-based binder The content of the electroconductive material in the mixture of the above-mentioned raw materials for the anode, was controlled so that the volume percentage of the electroconductive material is 2.5 volume % when the total volume of an anode mixture thus obtained is determined as 100%.

The mixture in the container was stirred for 30 seconds by an ultrasonic disperser (product name: UH-50, manufactured by: SMT Co., Ltd.) Next, the container was shaken for 30 minutes by a shaker (product name: TTM-1, manufactured by: Sibata Scientific Technology Ltd.), thereby preparing a raw material for an anode mixture.

The raw material for the anode mixture was applied on one surface of a copper foil (an anode current collector manufactured by UACJ Foil Corporation) by a blade method using an applicator. The applied raw material for the anode mixture was dried on a hot plate at 100° C. for 30 minutes, thereby forming an anode mixture.

(2) The Step of Forming Cathode Mixture

The following raw materials for a cathode were put in a container.
Cathode active material: $LiNi_{1/3}Co_{1/3}Mn_{1/3}O_2$ particles (average particle diameter: 6 µm)
Sulfide-based solid electrolyte: $Li_2S$—$P_2S_5$-based glass ceramic
Electroconductive material: VGCF
Binder: 5 Mass % butyl butyrate solution of a PVdF-based binder The mixture in the container was stirred for 30 seconds by the ultrasonic disperser (product name: UH-50, manufactured by: SMT Co., Ltd.) Next, the container was shaken for 3 minutes by the shaker (product name: TTM-1, manufactured by: Sibata Scientific Technology Ltd.) The mixture in the container was further stirred for 30 seconds by the ultrasonic disperser, thereby preparing a raw material for a cathode mixture.

The raw material for the cathode mixture was applied on one surface of an aluminum foil (a cathode current collector manufactured by Showa Denko K. K.) by the blade method using the applicator. The applied raw material for the cathode mixture was dried on the hot plate at 100° C. for 30 minutes, thereby forming a cathode mixture.

(3) The Step of Forming Solid Electrolyte Layer

The following raw materials for a solid electrolyte layer were put in a container.
Sulfide-based solid electrolyte: $Li_2S$—$P_2S_5$-based glass ceramic
Binder: 5 Mass % heptane solution of a BR-based binder The mixture in the container was stirred for 30 seconds by the ultrasonic disperser (product name: UH-50, manufactured by: SMT Co., Ltd.) Next, the container was shaken for 30 minutes by the shaker (product name: TTM-1, manufactured by: Sibata Scientific Technology Ltd.), thereby preparing a raw material for a solid electrolyte layer.

The raw material for the solid electrolyte layer was applied on one surface of a substrate (an aluminum foil manufactured by Showa Denko K. K.) by the blade method using the applicator. The applied raw material for the solid electrolyte layer was dried on the hot plate at 100° C. for 30 minutes, thereby producing a solid electrolyte layer.

(4) The Step of Producing all-Solid-State Lithium Ion Secondary Battery

A solid electrolyte material part was further placed on the anode mixture formed on the anode current collector (copper foil). A stack thus obtained was set on a roll press machine and pressed under the following pressing condition, thereby obtaining an anode side laminate I (solid electrolyte material part/anode mixture/anode current collector).

<Pressing Condition of Anode Side Laminate I>
Pressing pressure: About 630 MPa (line pressure: 20 kN/cm)
Pressing temperature: 25° C.

A solid electrolyte material part was further placed on the cathode mixture formed on the cathode current collector (aluminum foil). A stack thus obtained was set on the roll press machine and pressed under the following pressing condition, thereby obtaining a cathode side laminate I (solid electrolyte material part/cathode mixture/cathode current collector). The cathode side laminate I was produced slightly smaller than the anode side laminate I so that the area of the anode side laminate I was larger than that of the cathode side laminate I.

<Pressing Condition of Cathode Side Laminate I>
Pressing pressure: About 710 MPa (line pressure: 20 kN/cm)
Pressing temperature: 165° C.

To the solid electrolyte material part side of the anode side laminate I, the solid electrolyte layer on the substrate (aluminum foil) was further attached. A stack thus obtained was set on a flat uniaxial press machine and temporarily pressed under the following pressing condition, thereby integrating the solid electrolyte layer on the substrate with the solid electrolyte material part of the anode side laminate I.

<Temporary Pressing Condition>
Pressing pressure: 100 MPa
Pressing temperature: 25° C.
Pressing time: 10 Seconds Then, the aluminum foil on the solid electrolyte layer side was peeled off, thereby obtaining an anode side laminate II (solid electrolyte material part/anode mixture/anode current collector).

The cathode side laminate I and the anode side laminate II were stacked so that their surfaces on each of which the solid electrolyte material part was formed, were in contact with each other. A stack thus obtained was set on the flat uniaxial press machine and pressed under the following final pressing condition, thereby obtaining an all-solid-state lithium ion secondary battery.

<Final Pressing Condition>
Pressing pressure: 200 MPa
Pressing temperature: 135° C.
Pressing time: 1 Minute The all-solid-state lithium ion secondary battery was confined at a predetermined confining pressure using a confining jig. Then, a discharge test was carried out, which will be described below.

Examples 2 to 8 and Comparative Examples 1 and 2

All-solid-state lithium ion secondary batteries of Examples 2 to 8 and Comparative Examples 1 and 2 were produced in the same manner as Example 1, except that the type of the anode active material particles used in "(1) The step of forming anode mixture" and the volume percentage of the electroconductive material when the total volume of the anode mixture obtained in "(1) The step of forming anode mixture" was determined as 100%, were changed as shown in the following Table 1.

3. EVALUATION (1) Measurement of BET Specific Surface Area and Median Diameter of Anode Active Material Particles The BET specific surface area (m²/g) of the anode active material particles was measured by a specific surface area measuring machine (product name: NOVA e2000, manufactured by: Quantachrome Instruments Japan G. K.)

The median diameter D50 (μm) of the anode active material particles was measured by a dynamic light scattering (DLS) particle size distribution measuring machine (product name: Nanotrac Wave, manufactured by: MicrotracBEL Corp.)

(2) Discharge Test

For battery performance evaluation, the all-solid-state lithium ion secondary batteries underwent a discharge test by the following method.

First, each battery was charged with constant current-constant voltage at a 10-hour rate (1/10 C) until a voltage of 4.55 V was reached. At this time, a cutoff current was set to 1/100 C. Next, the charged battery was discharged with constant current-constant voltage until a voltage of 2.5 V was reached.

Next, the discharged battery was charged with constant current-constant voltage until a voltage of 4.35 V was reached. Then, the charged battery was discharged with constant current-constant voltage until a voltage of 3.0 V was reached. The charging until a voltage of 4.35 V and the discharging until a voltage of 3.0 V, were determined as one cycle, and 5 cycles of the charging and discharging were repeated.

The discharge capacity retention rate after 5 cycles was calculated by the following formula ($D_1$):

$$r = (C_5/C_{1st}) \times 100 \qquad \text{Formula } (D_1)$$

where r is the discharge capacity retention rate (%) after 5 cycles; $C_5$ is the discharge capacity (mAh) at the 5th cycle; and $C_{1st}$ is the discharge capacity (mAh) at the first cycle.

The following Table 1 shows the capacity retention rates after 5 cycles of Examples 1 to 8 and Comparative Examples 1 and 2, along with the properties of the anode active material particles, for comparison.

TABLE 1

| | | Anode active material particles | | Volume percentage C | | |
|---|---|---|---|---|---|---|
| | Production Number | BET specific surface area S (m²/g) | Median diameter D50 (μm) | (volume %) of electroconductive material | C/S | Capacity retention rate (%) after 5 cycles |
| Example 1 | Production Example 1 | 1.9 | 5.3 | 2.5 | 1.32 | 98.7 |
| Example 2 | Production Example 2 | 2.20 | 5.2 | 2.5 | 1.14 | 98.7 |
| Example 3. | Production Example 3 | 3.4 | 2.5 | 2.5 | 0.74 | 98.5 |
| Example 4 | Production Example 4 | 13.9 | 0.2 | 2.5 | 0.18 | 98.8 |
| Example 5 | Production Example 5 | 14.2 | 0.2 | 2.5 | 0.18 | 98.9 |
| Example 6 | Production Example 6 | 2.19 | 5.5 | 4.8 | 2.19 | 98.8 |
| Example 7 | Production Example 6 | 2.19 | 5.5 | 9.2 | 4.20 | 99.0 |
| Example 8 | Production Example 6 | 2.19 | 5.5 | 13.2 | 6.03 | 98.8 |
| Comparative Example 1 | Comparative Production Example 1 | 21.7 | 0.3 | 2.5 | 0.12 | 98.3 |
| Comparative Example 2 | Reference Production Example 1 | 2.11 | 5.5 | 0 | 0 | 98.0 |

4. CONCLUSION

According to Table 1, the capacity retention rates after 5 cycles of Examples 1 to 8, are 0.2% or more higher than the capacity retention rate after 5 cycles of Comparative Example 1. This is because the BET specific surface area of the anode active material particles used in each of Examples 1 to 8, is 1.9 m²/g or more and 14.2 m²/g or less, while the BET specific surface area of the anode active material particles used in Comparative Example 1 is as large as 21.7 m²/g.

Therefore, it was proved that by using the anode active material particles having a BET specific surface area of 1.9 m²/g or more and 14.2 m²/g or less, a decrease in capacity is inhibited, and excellent cycle characteristics are obtained, compared to the case of using the anode active material particles having a BET specific surface area outside the range.

Hereinafter, a relationship between the parameters (the BET specific surface area S and the C/S value) of the disclosed embodiments and the capacity retention rate of the all-solid-state lithium ion secondary battery, will be discussed using graphs and Table 1.

Figure 2:
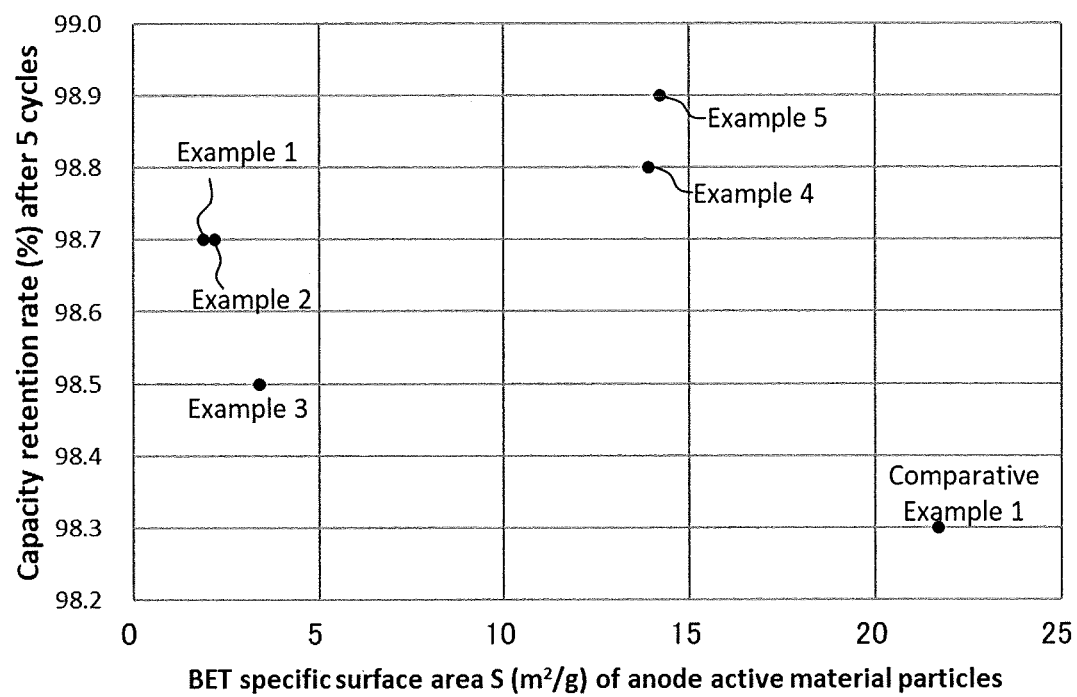
FIG. 2 is a graph showing, for each of Examples 1 to 5 and Comparative Example 1, a relationship between the BET specific surface area of the anode active material particles used and the capacity retention rate of the corresponding all-solid-state lithium ion secondary battery after 5 cycles.

FIG. 2 is a graph comparing the experimental results of Examples 1 to 5 and Comparative Example 1. FIG. 2 is a graph with the capacity retention rate after 5 cycles of the all-solid-state lithium ion secondary battery on the vertical axis, and the BET specific surface area S of the anode active material particles on the horizontal axis. In all of Examples 1 to 5 and Comparative Example 1, the volume percentage of the electroconductive material in the anode is 2.5 volume %.

As is clear from FIG. 2, as long as the BET specific surface area of the anode active material particles is 1.9 m²/g or more and 14.2 m²/g or less (Examples 1 to 5), the capacity retention rate after 5 cycles of the all-solid-state lithium ion secondary battery is high compared to the case where the BET specific surface area of the anode active material particles is outside the range (Comparative Example 1).

As is clear from Table 1, for the anode active material particles used in Comparative Example 2, the BET specific surface area is 1.9 m²/g or more and 14.2 m²/g or less. However, since the anode active material particles did not contain an electroconductive material, the capacity retention rate after 5 cycles was as low as 98.0%.

Figure 3:
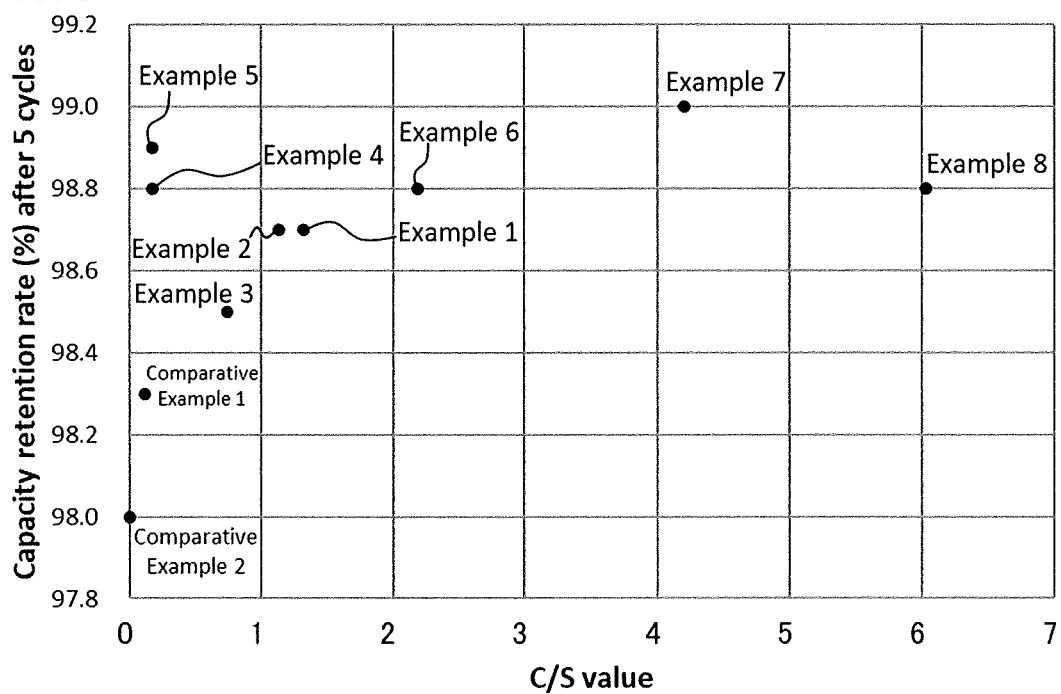
FIG. 3 is a graph showing, for each of Examples 1 to 8 and Comparative Examples 1 and 2, a relationship between the C/S value and the capacity retention rate of the corresponding all-solid-state lithium ion secondary battery after 5 cycles.

FIG. 3 is a graph comparing the experimental results of Examples 1 to 8 and Comparative Examples 1 and 2. FIG. 3 is a graph with the capacity retention rate after 5 cycles of the all-solid-state lithium ion secondary battery on the vertical axis and the C/S value of the battery on the horizontal axis. FIG. 3 shows the experimental results obtained by using the anode in which the volume percentage of the electroconductive material is from 0 volume % to 13.2 volume % (Examples 6 to 8 and Comparative Example 2) along with the experimental results obtained by using the anode in which the volume percentage of the electroconductive material is 2.5 volume % (Examples 1 to 5 and Comparative Example 1).

As is clear from FIG. 3, plots are distributed from the lower left to upper right of the graph, in an upwardly curving manner. More specifically, the following broad tendency is clear from FIG. 3: when the C/S value is less than 2.0, the capacity retention rates of the all-solid-state lithium ion secondary batteries are from 98.0% to 98.9% and vary; meanwhile, when the C/S value is 2.0 or more, the capacity retention rates converge to a range of from 98.8% to 99.0%.

The following tendency is suggested by the fact that, as described above, the capacity retention rates converge to the high level when the C/S value is sufficiently large. That is, the BET specific surface area of the anode active material particles of the disclosed embodiments has the lower limit (1.9 m²/g). Therefore, it is considered that the amount of the electroconductive material in the anode may be continuously increased in order to continuously increase the C/S value. However, there is a limit on increasing the capacity retention rate. When the C/S value is 0.2 or more, it can be said that the growth of the capacity retention rate tends to slightly slow down while the amount of the electroconductive material in the anode increases.

REFERENCE SIGNS LIST

1. Solid electrolyte layer
2. Cathode
3. Anode
101. Cathode-solid electrolyte layer-anode assembly

The invention claimed is:

1. An all-solid-state lithium ion secondary battery comprising an anode, the anode comprising:
   anode active material particles;
   an electroconductive material; and
   a solid electrolyte;
   wherein:
   the anode active material particles comprise at least one active material selected from the group consisting of elemental silicon and SiO,
   the anode active material particles have a mean diameter D50 in the range of from 2.4 μm to 6.0 μm,
   a BET specific surface area (S) of the anode active material particles is 1.9 m²/g or more and 14.2 m²/g or less, and
   a C/S value is 0.18 or more and 6.03 or less, wherein:
   C/S value=a volume percentage (%) of the electroconductive material (C) in the anode /the BET specific surface area (S).

2. The all-solid-state lithium ion secondary battery according to claim 1, wherein the solid electrolyte is a sulfide-based solid electrolyte.

3. The all-solid-state lithium ion secondary battery according to claim 1, wherein the electroconductive material is at least one carbonaceous material selected from the group consisting of carbon black, carbon nanotube and carbon nanofiber.

4. The all-solid-state lithium ion secondary battery according to claim 1, wherein an amount of the solid electrolyte in the anode is 10 mass % or more.

5. The all-solid-state lithium ion secondary battery according to claim 1, wherein an amount of the solid electrolyte in the anode is in the range of from 20 mass % to 50 mass %.

6. The all-solid-state lithium ion secondary battery according to claim 1, wherein an amount of the solid electrolyte in the anode is in the range of from 25 mass % to 45 mass %.

7. The all-solid-state lithium ion secondary battery according to claim 1, wherein a ratio of the anode active material (mass %) to the solid electrolyte (mass %) in the anode is from 85:15 to 30:70.

8. The all-solid-state lithium ion secondary battery according to claim 1, wherein a ratio of the anode active material (mass %) to the solid electrolyte (mass %) in the anode is from 80:20 to 40:60.

9. The all-solid-state lithium ion secondary battery according to claim 1, wherein the mean diameter D50 of the anode active material particles is in the range of from 2.4 μm to 5.6 μm.

10. The all-solid-state lithium ion secondary battery according to claim 1, wherein the volume percentage (%) of the electroconductive material (C) is in the range of from 2.5 volume % to 13.2 volume %.

11. The all-solid-state lithium ion secondary battery according to claim 1, wherein the volume percentage (%) of the electroconductive material (C) is in the range of from 2.5 volume % to 9.2 volume %.

* * * * *